C. CHAMBERS, Jr.
CONTROLLING MECHANISM.
APPLICATION FILED DEC. 17, 1910.

1,014,376.

Patented Jan. 9, 1912.
2 SHEETS—SHEET 1.

WITNESSES:

INVENTOR
Cyrus Chambers Jr.
BY
ATTORNEY.

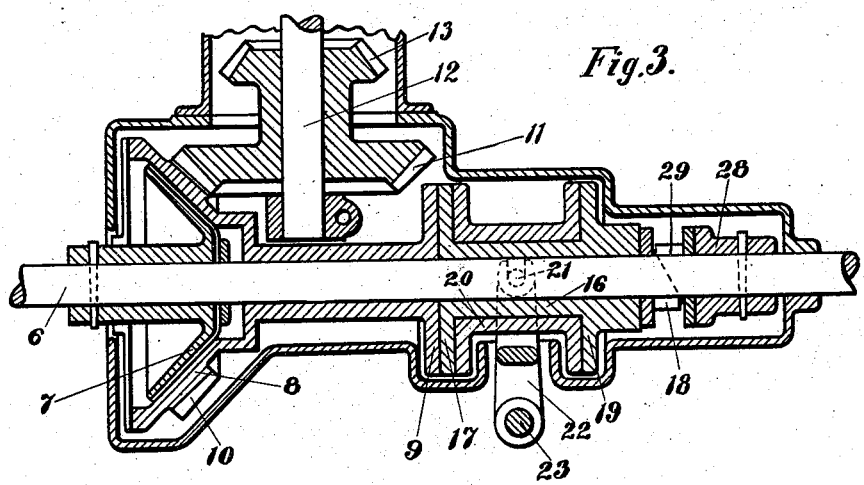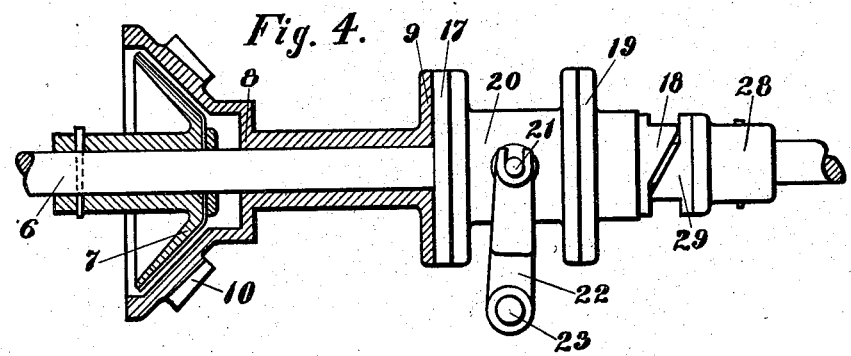

UNITED STATES PATENT OFFICE.

CYRUS CHAMBERS, JR., OF OVERBROOK, PENNSYLVANIA, ASSIGNOR TO CHAMBERS BROTHERS COMPANY, A CORPORATION OF PENNSYLVANIA.

CONTROLLING MECHANISM.

1,014,376.  Specification of Letters Patent.  Patented Jan. 9, 1912.

Application filed December 17, 1910. Serial No. 597,758.

*To all whom it may concern:*

Be it known that I, CYRUS CHAMBERS, Jr., a citizen of the United States, residing at Overbrook, in the county of Montgomery and State of Pennsylvania, have invented a new and useful Controlling Mechanism, of which the following is a specification.

My invention relates to controlling mechanism.

My object is to provide improvements in automatic means for controlling the efficiency of transmission of power from one rotating element to another.

My invention is especially useful in securing unison in speed of operation of the several parts of a machine, although said speed or the work to be performed, may be constantly varying.

My invention comprises means whereby a positively driven rotating element communicates a varying frictional contact with other elements, a varying speed and power is transmitted to other elements of the device.

My invention especially comprises means of great efficiency and directness of action, for automatically controlling the effectiveness of the clutch transmission of power from or between different rotative elements.

Figure 1:
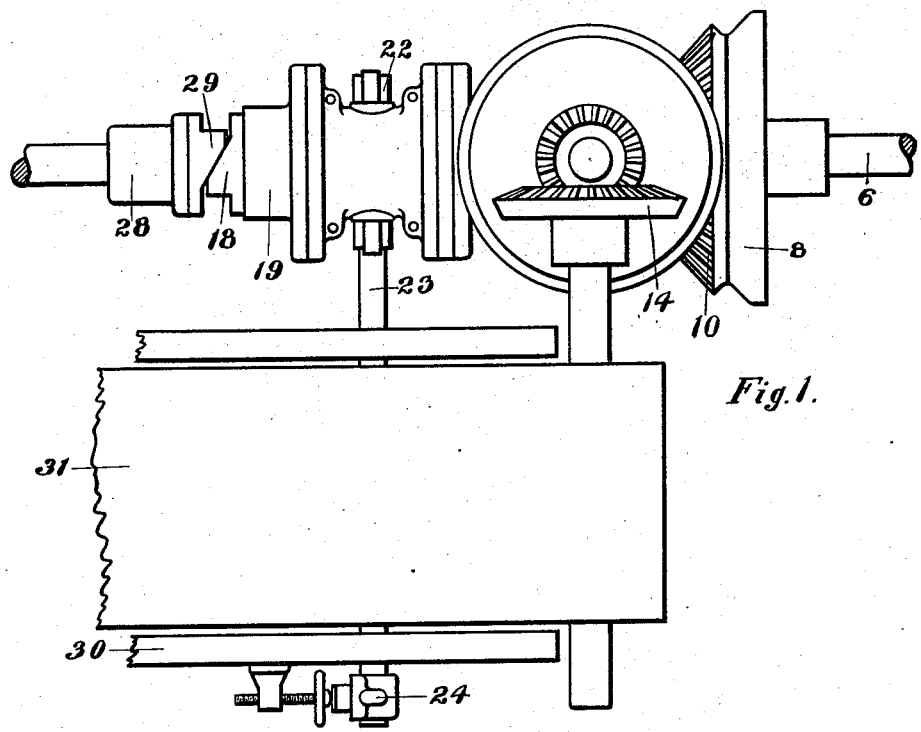
Figure 2:
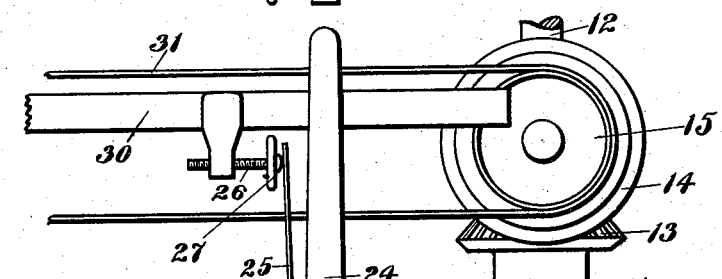
Figure 2:
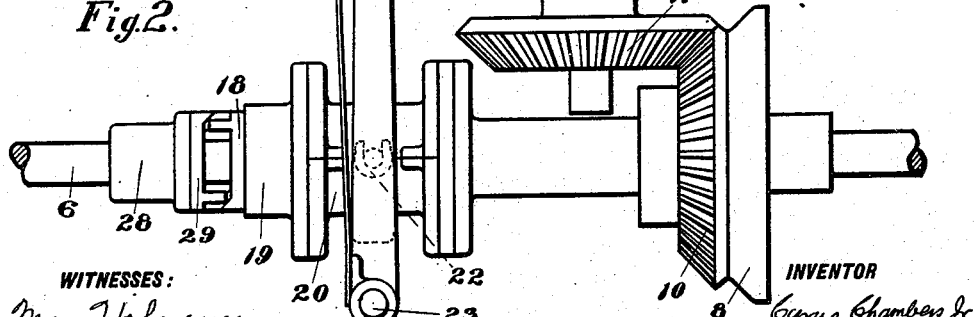

Referring to the drawings illustrating a specific example of mechanism for realizing my invention:—Figure 1 is a plan view of mechanism embodying my invention, as applied to the measuring wheel of a brick machine. Fig. 2 is a side elevation of same. Fig. 3 is a vertical longitudinal section showing the mechanism inclosed in a casing. Fig. 4 is a part longitudinal vertical section and part elevation. Fig. 5 is a perspective view of a beveled segment element.

Similar numerals refer to similar parts throughout the several views.

As an example of a specific embodiment of my invention and the application thereof, I have shown in the drawings the invention embodied in mechanism connected with the measuring wheel of a brick machine.

The usual line shaft 6 is driven from a suitable source of power at a speed greater than is required for the elements driven thereby. Upon this line shaft 6 is the positively driven clutch element 7, adapted to coöperate with the clutch element 8 which is connected with, or part of a sleeve loosely mounted on the line shaft 6. The sleeve of clutch member 8 is provided at its other end with the disk portion 9. A second sleeve 16 is loosely mounted on shaft 6 having at one end thereof, a disk 17 adapted to have frictional engagement with disk 9. At the other end of sleeve 16 is provided the beveled segments 18. A sleeve or collar 20 is loosely mounted on sleeve 16 between flange 19 and flange formed by disk 17. The sleeve 20 is provided with trunnions 21. These trunnions engage with the ends of lever 22, mounted on rock shaft 23. A positively driven collar 28 is also mounted on shaft 6, and is provided with the beveled segments 29 which coöperate with the beveled segments 18. The rock shaft 23 is provided with a hand lever 24 for manual operation. Connected with the hand lever 24 is the spring 25 adapted to engage with a threaded member 26 having adjustable connection with the measuring table 30, said adjustment being secured by the hand wheel 27. The clutch element 8 is provided with gear teeth 10, adapted to coöperate with the bevel gear 11 on shaft 12, to which is also connected gear 13, which coöperates with gear 14 on the shaft of the measuring wheel 15. Shaft 12, it will be understood, may be extended and connected by suitable gearing or other means, with cut-off or other mechanism as may be required.

Operation: Assuming that the machine is now ready for operation, and started up without any clay upon the regulating belt, with just sufficient force exerted by spring 25, on hand lever 24 to drive shaft 12, and any mechanism that may be connected therewith, through clutch elements 7 and 8 and friction disks 9 and 17. Under these conditions the beveled segments 29 on the collar 28 will contact with the beveled segments 18 on the sleeve 16, and tend to drive sleeve 16 around with shaft 6. Contact between said coöperating beveled segments tend to force sleeve 16 in a longitudinal direction, slightly along shaft 6, thus bringing disks 9 and 17 into closer or more effective frictional engagement. This in turn tends to move clutch element 8 into closer or more effective frictional engagement with clutch element 7. It will now be seen that power is transmitted from shaft 6 to shaft 12, through the positively driven clutch element 7 and the positively driven collar 28 having the beveled segments 29, and the parts intermediate thereto, which are loosely mounted on the shaft. The efficiency or effectiveness of such transmission is controlled, at all times, by the relative positions of the beveled segments. The said relative positions are due to variations in speed of travel therebetween. If but little power is required to be transmitted from shaft 6, to shaft 12, for example, these segments assume such respective positions that the pressure between friction disks 9 and 17 and friction elements 7 and 8 is comparatively slight. If considerable power is required to be transmitted from shaft 6 to shaft 12, these beveled segments assume such positions as will result in forcing friction disk 17 into more efficient engagement with disk 9, and clutch element 8 into more efficient engagement with clutch element 7.

It will be noted that element 7 and collar 28 are fixed to the shaft 6, or at least positively driven thereby, so that relative movement, between beveled segments 29 and 18, resutls in a vise-like action upon said loosely mounted elements 8, 9, 17 and 18, between said fixed and positively driven elements 7 and 28.

The normal pressure between beveled segments 18 and 29, is secured by the tension of the spring 25, which tension may be adjusted by turning the hand wheel 27. When the clay bar issues on the regulating belt 31 and approaches the measuring wheel 15 the resistance to the operation of the whole general device, by its load or weight, is increased, and when the bar of clay has reached the cutter and the cutting operation begins, very much more power is required to operate the same. This naturally tends to retard the speed of the cutting mechanism connected with shaft 12, and this causes an additional pressure to be exerted between the beveled segments 18 and 29. As the loose sleeve 16 must make the same number of revolutions per minute as shaft 6 makes, the friction between disk 17 and disk 9, is increased by the greater resistance. That is to say, the tendency of beveled segment 29 to rotate faster than beveled segment 18, due to the resistance of shaft 12, tends to cause a relative rotative movement between beveled segments 29 and 18, and thus force the friction disks 17 and 9 into a more efficient engagement, and clutch elements 8 and 7 also into more efficient engagement.

It will be remembered that shaft 6 is adapted to run faster than the other working parts, for example shaft 12, and consequently sleeve 16 will run faster than the sleeve of clutch element 8. Hence there is always more or less relative frictional movement between elements 9 and 17 and between elements 7 and 8. By changing the angle of the beveled faces on the segments 17 and 18 the power to rotate sleeve 16, relatively to its end motion, may be varied and thus the relative efficiency of engagement between friction disks 9 and 17 and clutch elements 7 and 8, may be varied. Thus the relative increase or decrease of frictional power may be varied to suit the requirements of the operation. For example, by diminishing the incline of the beveled faces, the end pressure may be increased in proportion to the rotating tendency, and consequently the efficiency of frictional engagement between elements 9 and 17 and 7 and 8 may be correspondingly increased. This results in increase of the efficiency of power transmission in proportion to the resistance to rotation. On the other hand, if the inclination of the beveled faces of the segments be increased the tendency to rotate sleeve 16 is increased as compared with the tendency to force it endwise. Thus is lessened the relative efficiency of frictional engagement between the disks and clutch elements. I thus obtain a varying efficiency of clutch transmission, affected by the push or pull of the clay bar through the measuring wheel. By making the disk 17, which coöperates with disk 9, and forces the clutch elements 7 and 8 into more efficient engagement, revolve almost positively with the line shaft 6, it will be seen that, as the pressure increases between disks 9 and 17, the tendency is to drive element 8 more nearly up to the speed of shaft 6. It is believed that, as the resistance to the rotation of shaft 12, due to operation of cut-off mechanism, is increased, the efficiency of frictional transmission of power is adequately increased, and the regulation becomes instantly automatic.

It has been found in practice that the device is so sensitive in operation and so thoroughly automatic, that a machine will run entirely idle and then be made to do the greatest amount of work required of it, without any readjustment of the spring pressure on the hand lever 24. That is to say, the device has proved so sensitive, and at the same time, so positive and efficient in its operation that it is capable of taking care of an extremely wide range in variation of amount of work required.

It will be understood, that, by way of illustration, I have shown the elements 7 and 8 in form of cone clutch elements, and elements 9 and 17 in the form of friction disks. It will be obvious that cone or other form of clutch elements may be substituted for the friction disk elements, or friction disk or other friction element may be substituted for the cone clutch, without departing from the spirit of my invention. The specific form of friction or clutch elements will obviously depend upon the conditions under which the device is designed to operate.

What I claim is:—

1. A line shaft, a positively driven clutch element, a positively driven element spaced apart from the clutch element and a plurality of friction elements loosely mounted between said positively driven elements, one of said loosely mounted elements having a coöperating bevel.

2. A rotatable shaft, a positively driven friction element, another positively driven element spaced apart from said friction element, and a plurality of friction elements loosely mounted between the said positively driven elements, one of said loosely mounted elements having an incline engagement with the positively driven element.

3. A rotatable shaft, a positively driven friction element, another positively driven element spaced apart from said friction element, a plurality of friction elements loosely mounted on the shaft between the said positively driven elements, one of said loosely mounted elements having an incline engagement with a positively driven element, and resilient means for normally controlling the incline engagement.

4. A rotatable shaft, a positively driven friction element, another positively driven element spaced apart from said friction element, a plurality of friction elements loosely mounted on the shaft between the said positively driven elements, one of said loosely mounted elements having an incline engagement with a positively driven element, resilient means for normally controlling said incline engagement, and means for adjusting the resilient control.

5. A rotatable shaft, a positively driven friction element, another positively driven element spaced apart from the friction element, a plurality of friction elements loosely mounted on the shaft between the said positively driven elements, one of said loosely mounted elements having an incline engagement with a positively driven element, and a spring acting on said loosely mounted element having the incline engagement.

6. A rotatable shaft, a friction element rotatably fixed therewith, another element spaced apart from the friction element and also fixed with the shaft, a plurality of friction elements loosely mounted on the shaft between the said fixed elements, one of said loosely mounted elements having a beveled face engagement with the fixed element, a spring acting on the loosely mounted element having the beveled face engagement, and means for adjusting the spring tension.

7. A rotatable shaft, a friction clutch element rotatably fixed therewith, a collar also fixed with the shaft and spaced apart from the clutch element, a coöperating clutch element loosely mounted on the shaft and provided with an oppositely facing friction disk, a sleeve also loosely mounted on the shaft having at one end a coöperating friction disk, at the other end a face for incline engagement with the fixed collar.

8. A rotatable shaft, a friction clutch element rotatably fixed therewith, a collar provided with beveled segments also fixed with the shaft and spaced apart from the clutch element, a coöperating clutch element loosely mounted on the shaft and provided with an oppositely facing friction disk, a sleeve also loosely mounted on the shaft having at one end a coöperating friction disk and at the other end coöperating beveled segments.

9. A rotatable shaft, a friction clutch element rotatably fixed therewith, a collar provided with beveled segments also fixed with the shaft and spaced apart from the clutch element, a coöperating clutch element loosely mounted on the shaft and provided with an opositely facing friction disk, a sleeve also loosely mounted on the shaft having at one end a coöperating friction disk and at the other end coöperating beveled segments, and resilient means for normally controlling the engagement of the beveled segments.

10. A rotatable shaft, a friction element rotatably fixed therewith, a collar spaced apart from the friction element and also fixed with the shaft, a plurality of friction elements loosely mounted on the shaft, between the collar and the fixed friction element, one of said loosely mounted elements having an incline engagement with the fixed collar, and manually operated means for controlling the engagement of said friction elements.

11. A rotatable shaft, a friction element rotatably fixed therewith, a collar spaced apart from the friction element and also fixed with the shaft, a plurality of friction elements loosely mounted on the shaft, between the collar and the fixed friction element, one of said loosely mounted elements having an incline engagement with the collar, and spring controlled manually operated means for controlling the engagement of said friction elements.

CYRUS CHAMBERS, Jr.

Witnesses:
    MAE HOFMANN,
    HOWARD S. OKIE.

Copies of this patent may be obtained for five cents each, by addressing the "Commissioner of Patents, Washington, D. C."